(12) United States Patent
Mitra et al.

(10) Patent No.: US 9,824,401 B2
(45) Date of Patent: Nov. 21, 2017

(54) DATA EXCAVATOR

(71) Applicant: BANK OF AMERICA CORPORATION, Charlotte, NC (US)

(72) Inventors: Sanjay Mitra, Haryana (IN); Shveta Mittal, Haryana (IN); Kunal Jain, Delhi (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 243 days.

(21) Appl. No.: 14/588,427

(22) Filed: Jan. 1, 2015

(65) Prior Publication Data

US 2016/0196614 A1    Jul. 7, 2016

(51) Int. Cl.

| | |
|---|---|
| *G07B 17/00* | (2006.01) |
| *G07F 19/00* | (2006.01) |
| *G06Q 40/00* | (2012.01) |
| *G06Q 30/00* | (2012.01) |
| *G06F 7/00* | (2006.01) |
| *G06F 17/30* | (2006.01) |
| *G06F 21/33* | (2013.01) |
| *G06F 21/62* | (2013.01) |
| *G06Q 10/00* | (2012.01) |
| *G06Q 10/10* | (2012.01) |

(52) U.S. Cl.
CPC ............. *G06Q 40/12* (2013.12); *G06F 21/33* (2013.01); *G06F 21/6227* (2013.01); *G06F 21/6245* (2013.01); *G06F 17/30* (2013.01); *G06Q 10/00* (2013.01); *G06Q 10/10* (2013.01); *G06Q 40/00* (2013.01)

(58) Field of Classification Search
CPC ........ G06Q 40/00; G06Q 30/00; G06Q 10/00; G06Q 10/10; G06F 17/30
USPC ......... 705/14.53, 35, 28; 707/812, 799, 736; 709/217, 223; 726/6, 30
See application file for complete search history.

(56) References Cited

U.S. PATENT DOCUMENTS

| | | | | |
|---|---|---|---|---|
| 4,914,587 | A * | 4/1990 | Clouse | G06Q 20/40 235/379 |
| 5,202,984 | A * | 4/1993 | Kashio | G06F 17/30174 |
| 8,099,336 | B2 * | 1/2012 | Klim | G06Q 10/08 235/379 |
| 2002/0124188 | A1 * | 9/2002 | Sherman | G06Q 10/10 726/6 |
| 2004/0024853 | A1 * | 2/2004 | Cates | G06F 8/67 709/223 |
| 2004/0128195 | A1 * | 7/2004 | Sorem | G06Q 30/0255 705/14.53 |

(Continued)

*Primary Examiner* — Olusegun Goyea
(74) *Attorney, Agent, or Firm* — Michael A. Springs; Moore & Van Allen PLLC; Anup Shrinivasan

(57) ABSTRACT

The present invention is directed to a system that updates files with updated financial data. The system of the present invention is configured to receive from a user one or more selections of files (e.g., datastores of financial data utilized and/or referenced by financial reporting application for purposes of generating up-to-date financial reports) to be updated with updated financial data. The user is further enabled by the system of the present invention to schedule importations of updated financial data into each selected file. The system of the present invention also is configured to generate a report of complete file updates so that the user may more effectively monitor and review the file-updating processes.

17 Claims, 4 Drawing Sheets

(56) References Cited

U.S. PATENT DOCUMENTS

| | | | | |
|---|---|---|---|---|
| 2006/0041494 A1* | 2/2006 | Tinnirello | G06Q 40/00 | 705/35 |
| 2006/0070019 A1* | 3/2006 | Vishnumurty | G06F 17/30289 | 717/101 |
| 2008/0301010 A1* | 12/2008 | Klim | G06Q 10/08 | 705/28 |
| 2010/0023562 A1* | 1/2010 | Kreuch | G06F 17/30011 | 707/E17.008 |
| 2011/0252069 A1* | 10/2011 | Brodie | G06F 9/50 | 707/799 |
| 2012/0011118 A1* | 1/2012 | Gleicher | G06F 17/2235 | 707/736 |
| 2012/0209892 A1* | 8/2012 | MacAskill | G01R 31/3177 | 707/812 |
| 2013/0291126 A1* | 10/2013 | Thomson | G06F 17/30014 | 726/30 |
| 2015/0169717 A1* | 6/2015 | Wang | G06F 11/1453 | 707/618 |

\* cited by examiner

DATA EXCAVATOR

BACKGROUND

When generating reports of financial data, it is critical that financial data included in the reports is up-to-date. Financial reporting applications (e.g., applications responsible for generating the reports) typically collect, utilize, reference, and/or store financial data, which is then utilized in generating financial reports.

The financial data is retrieved by the financial reporting applications from one or more electronic files. These files are often stored in a variety of different formats and on different servers of different server types. While these files are typically updated on a regular basis, the frequency of updating each file is highly variable and potentially inconsistent with one another. As such, the financial data utilized for generating financial reports may not be consistently up-to-date.

Therefore, because it is indeed critical that financial reports are generated with up-to-date financial data, a need exists for a system that facilitates scheduled updating of financial data held in multiple files of different formats and stored in various storage locations across an Enterprise Performance Management (EPM) platform.

BRIEF SUMMARY

The present invention is directed to a system that updates files with updated financial data, which can then be utilized by financial reporting applications. The system of the present invention is configured to receive from a user one or more selections of files (e.g., datastores of financial data utilized and/or referenced by financial reporting application for purposes of generating up-to-date financial reports) to be updated with updated financial data. The user is further enabled by the system of the present invention to schedule importations of updated financial data into each selected file. In this way, the system of the present invention is configured to enable a user to quickly and efficiently import updated financial data into one or more files. Additionally, the system of the present invention is configured to save the user's authentication credentials, thereby enabling the user to access multiple files on multiple servers without requiring the user to provide user authentication credentials multiple times (e.g., once for each file and/or each server). The system of the present invention also is configured to generate a report of complete file updates so that the user may more effectively monitor and review the file-updating processes.

The system of the present invention provides many benefits. First, the system of the present invention eliminates the need for manual importation of updated financial data into a plurality of files. Moreover, by enabling the user to schedule importations of updated financial data into multiple files, the system of the present invention drastically reduces the amount of sustained human effort required to update files with updated financial data. Essentially, the system of the present invention streamlines financial data-updating processes and saves financial institutions a considerable amount of time and resources when importing updated financial data into files. Since this updated financial data is then utilized by financial reporting applications, the system of the present invention promotes generation of more up-to-date (and potentially more accurate) financial reports.

In some embodiments, a system for updating files with updated financial data is provided. The system comprises: at least one memory; at least one processor; and at least one module stored in said memory and comprising instruction code that is executable by the at least one processor and configured to cause said at least one processor to: receive input from a user, the input comprising information identifying at least one file; determine one or more files to be updated based on the received input; retrieve updated financial data from at least one storage location; and update the one or more files with the updated financial data.

In some embodiments, the input comprises a schedule of at least one predetermined date and time for updating the one or more files.

In some embodiments, the at least one predetermined date and time for updating the one or more files is recurring.

In some embodiments, updating the one or more files comprises writing the updated financial data into the file, thereby replacing any existing data in the file with the updated financial data.

In some embodiments, updating the one or more files comprises writing the updated financial data into the file, thereby appending any existing data in the file with the updated financial data.

In some embodiments, the module further comprises instruction code configured to cause said processor to generate a report based on updating the one or more files, the report comprising a server name, a file name, a file path, and a refresh time of each of the one or more updated files.

In some embodiments, generating the report comprises transmitting the report to a mobile device of the user.

In some embodiments, determining one or more files to be updated comprises generating an update queue and adding each of the one or more files to be updated to the update queue.

In some embodiments, the information identifying at least one file comprises at least one of a server type, a server name, a server location, a server selection, a file path, a workbook name, a worksheet name, a file name, an Internet Protocol (IP) address, and a file selection.

In some embodiments, the input is received from a mobile device of the user.

In some embodiments, the module further comprises instruction code configured to cause said processor to: request authentication credentials of a user; receive authentication credentials from the user; validate the authentication credentials of the user, the validating comprising: comparing the authentication credentials of the user to one or more predetermined authentication credentials stored in a database; and determining a match between the authentication credentials of the user and one of the one or more predetermined authentication credentials; and provide the system with read access and write access to each of the one or more files to be updated.

In some embodiments, the module further comprises instruction code configured to cause said processor to transmit the one or more updated files to an apparatus for generation of a financial report comprising the updated financial data of the one or more updated files.

In some embodiments, a method for updating files with updated financial data is provided. The method comprises: receiving, by a computing device processor and from a user, input comprising information identifying at least one file; determining, by a computing device processor, one or more files to be updated based on the received input; retrieving, by a computing device processor and from at least one storage location, updated financial data; and updating, by a computing device processor, the one or more files with the updated financial data.

In some embodiments, the method further comprises generating a report based on updating the one or more files, the report comprising a server name, a file name, a file path, and a refresh time of each of the one or more updated files.

In some embodiments, a computer program product for updating files with updated financial data is provided. The computer program product comprises a non-transitory computer-readable medium comprising code causing an apparatus to: receive input from a user, the input comprising information identifying at least one file determine one or more files to be updated based on the received input; retrieve updated financial data from at least one storage location; and update the one or more files with the updated financial data.

In some embodiments, the non-transitory computer-readable medium comprises code further causing an apparatus to generate a report based on updating the one or more files, the report comprising a server name, a file name, a file path, and a refresh time of each of the one or more updated files.

The features, functions, and advantages that have been discussed may be achieved independently in various embodiments of the present invention or may be combined in yet other embodiments, further details of which can be seen with reference to the following description and drawings.

BRIEF DESCRIPTION OF THE DRAWINGS

Figure 1:
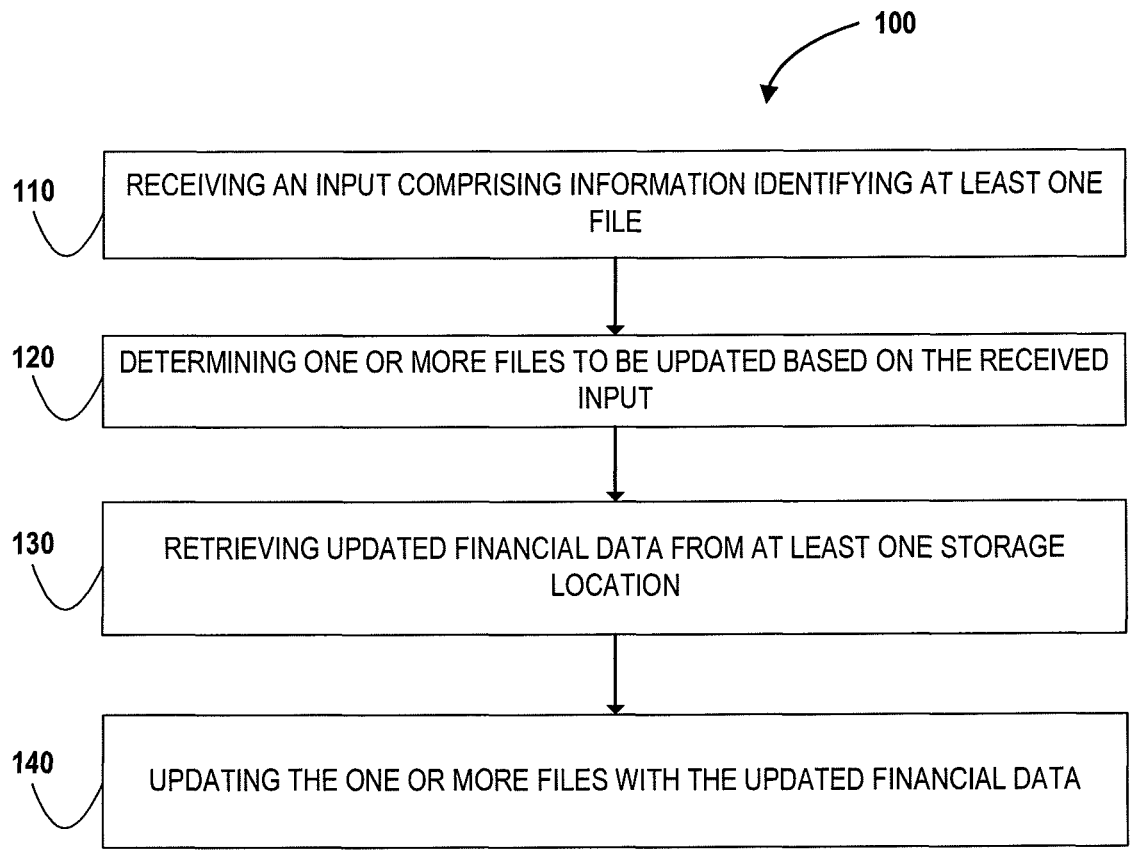
Figure 2:
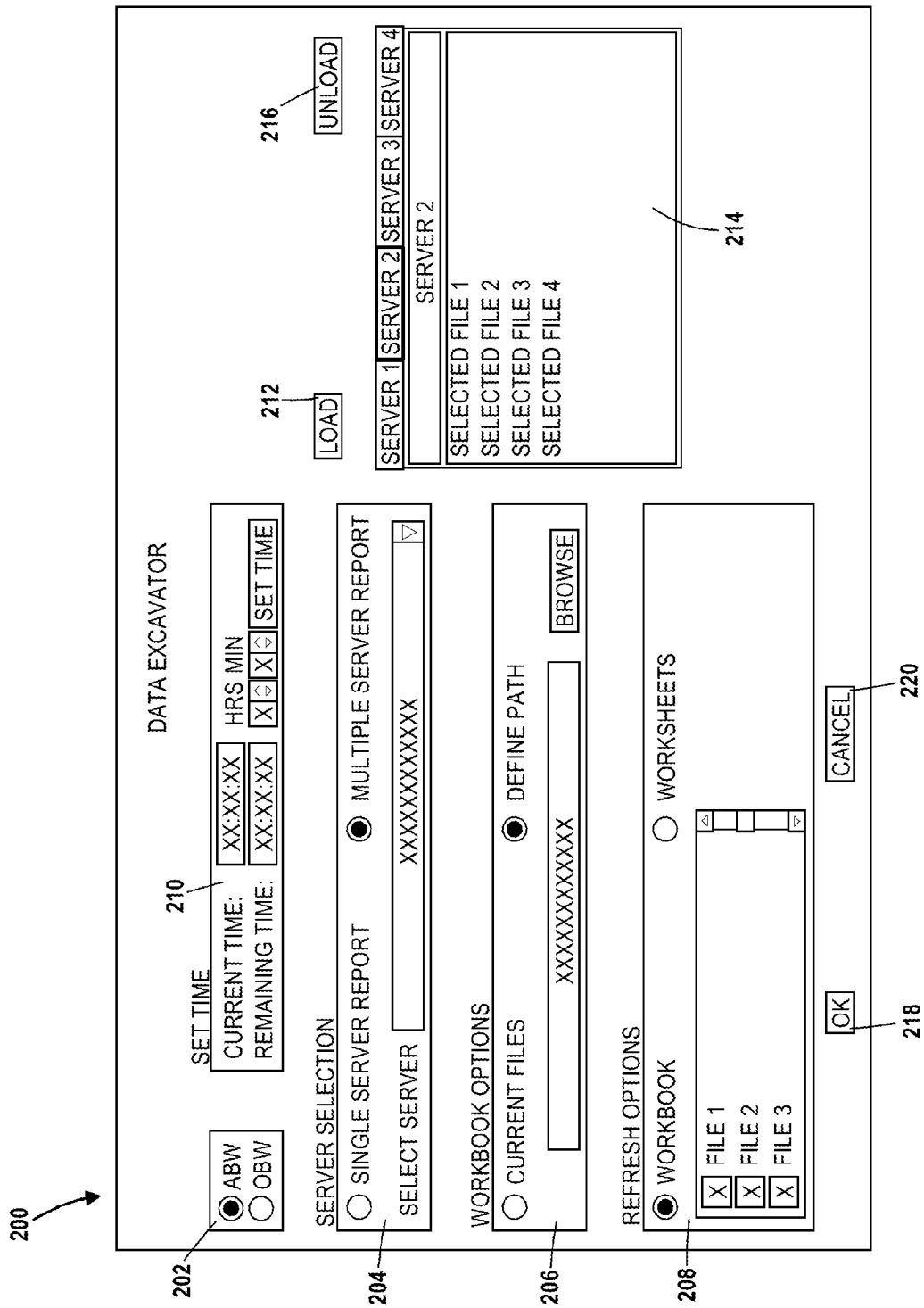
Figure 3:
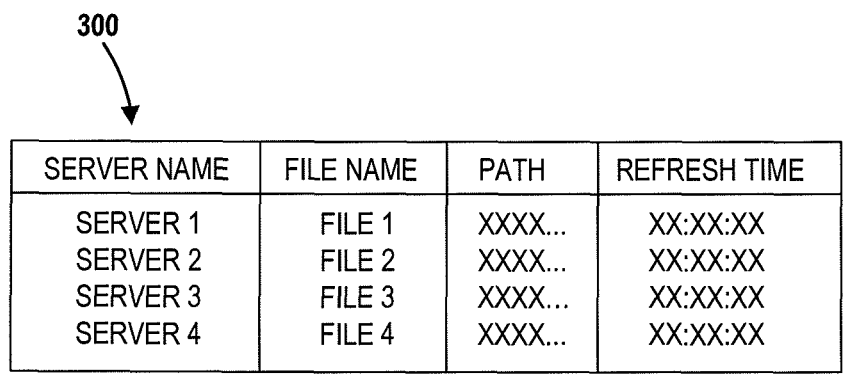
Figure 4:
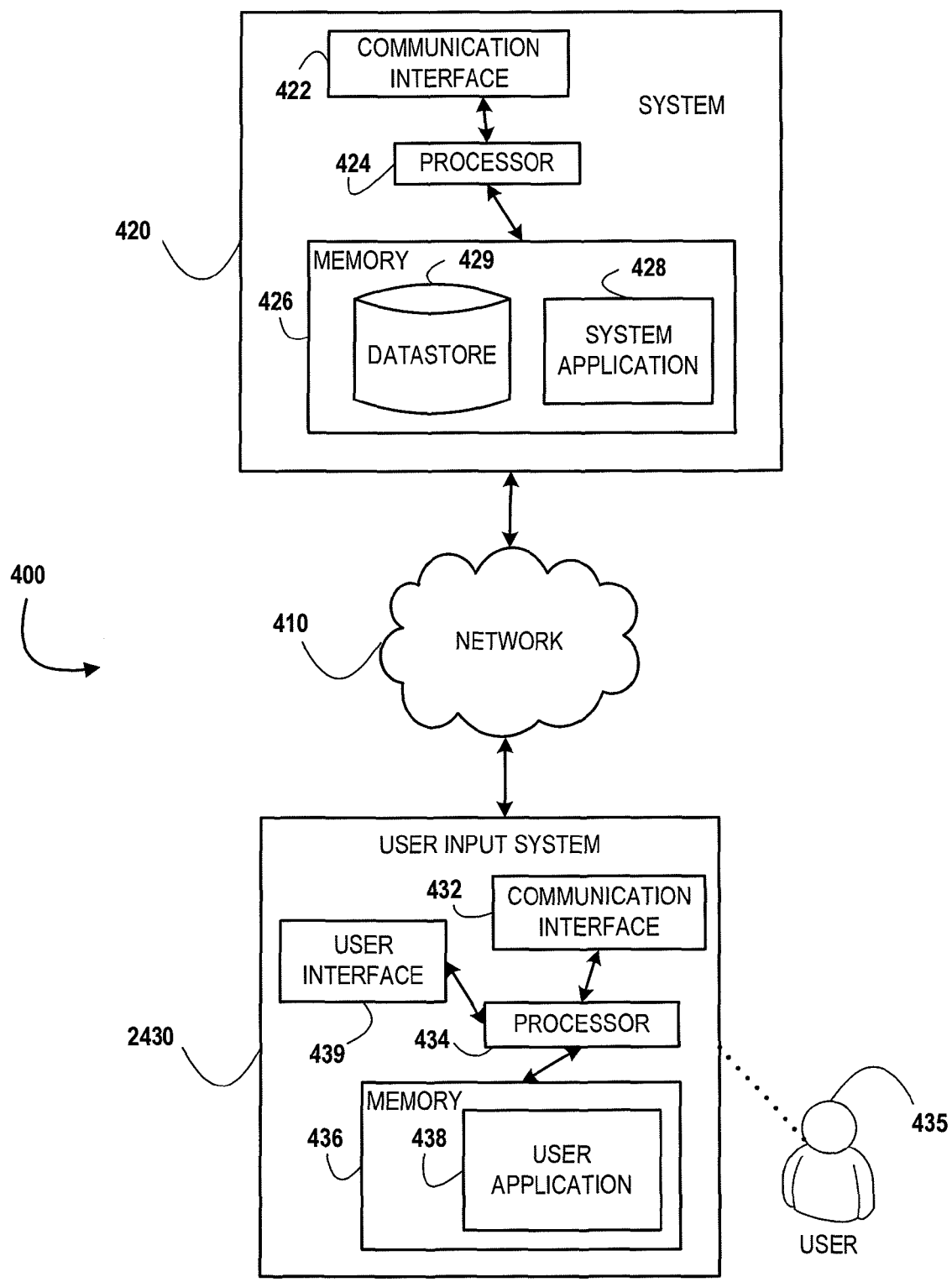

Having thus described embodiments of the invention in general terms, reference will now be made to the accompanying drawings, where:

FIG. 1 is an exemplary process flow illustrating a process for updating files with updated financial data, in accordance with embodiments of the present invention;

FIG. 2 is an exemplary user interface for enabling a user to select files that are to be updated with updated financial data, in accordance with embodiments of the present invention;

FIG. 3 is an exemplary user interface for enabling a user to review a generated update report, in accordance with embodiments of the present invention; and FIG. 4 is an exemplary system environment for a data excavator system, in accordance with embodiments of the present invention.

DETAILED DESCRIPTION OF THE PRESENT INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In other embodiments, an "entity" may a non-financial institution such as a third party data processing firm.

As used herein, the term "user" refers to anyone who interacts with the present invention. Typically, the user is an associate (e.g., an employee, agent, contractor, or the like) of a financial institution (e.g., the entity) who is responsible for updating files with updated financial data. The user may also be a data processing specialist, a researcher, an information technology specialist, a teller, or another type of associate.

As used herein, the term "file" refers to any type of file. For example, a file may include a spreadsheet, a text file, a workbook, a database, datastore, server, or other type of storage location, a financial reporting application or any other type of application or program, and/or the like. In this way, the file may exist in a variety of formats with different file extensions. Typically, the file is some sort of workbook that holds financial data and is utilized and/or referenced by a financial reporting application for data processing and reporting purposes. However, this is not required and, as such, the present invention may be applied generally to updating files with data.

The system of the present invention may be integrated with a financial data system such as an Enterprise Performance Management (EPM) platform, which stores large volumes of financial data (e.g., account information, contact information, transaction information, storage information, and/or the like). In this way, the system of the present invention is configured to receive, store, and transmit information between various devices and storage (e.g., memory) locations and/or other apparatuses and systems. In some embodiments, the EPM platform is operated and/or maintained by the entity. In other embodiments, the EPM platform is operated and/or maintained by a third party.

The present invention is directed to a system that provides an automatic importation of updated financial data into files, which can then be utilized by financial reporting applications. The system of the present invention is configured to receive from a user one or more selections of files (e.g., datastores of financial data utilized and/or referenced by financial reporting application for purposes of generating up-to-date financial reports) to be updated with updated financial data. The user is further enabled by the system of the present invention to schedule importations of updated financial data into each selected file. In this way, the system of the present invention is configured to enable a user to quickly and efficiently import updated financial data into one or more files. Additionally, the system of the present invention is configured to save the user's authentication credentials, thereby enabling the user to access multiple files on multiple servers without requiring the user to provide user authentication credentials multiple times (e.g., once for each file and/or each server). The system of the present invention also is configured to generate a report of complete file updates so that the user may more effectively monitor and review the file-updating processes.

The system of the present invention provides many benefits. First, the system of the present invention eliminates the need for manual importation of updated financial data into a plurality of files. Moreover, by enabling the user to schedule importations of updated financial data into multiple files, the system of the present invention drastically reduces the amount of sustained human effort required to update files with updated financial data. Essentially, the system of the present invention streamlines financial data-updating processes and saves financial institutions a considerable amount of time and resources when importing updated financial data into files. Since this updated financial data is then utilized by financial reporting applications, the system of the present invention promotes generation of more up-to-date (and potentially more accurate) financial reports.

Referring now to the figures, FIG. 1 is an exemplary process flow 100 illustrating a process for updating files with updated financial data. At block 110, the process includes receiving, from a user, input comprising information identifying at least one file. At block 120, the process includes determining one or more files to be updated based on the received input. At block 130, the process includes retrieving updated financial data from at least one storage location. At block 140, the process includes updating the one or more files with the updated financial data.

FIG. 2 exemplary user interface 200 for enabling a user to select files that are to be updated with updated financial data. The user interface 200 may be accessed by the user on a mobile device, an input device, a desktop or laptop computer, a tablet, a smartphone, and/or the like. The user is first enabled by the system of the present invention to select a server type 202. The system of the present invention is configured to then receive the user's selection of server type 202. The server type may correspond to an analytical business warehouse (ABW) server type or an outsider business warehouse (OBW) server type. A server of the OBW server type typically refers to a local server (e.g., a server that is native to a platform that generates, reports, and/or updates financial data, or the like) that holds raw financial data (e.g., financial data that has recently been generated, released, and/or updated), while a server of the ABW server type typically refers to a proxy server (e.g., a server that serves as an intermediary storage platform between a server of the OBW server type and any outside application that requires access to updated financial data) that holds finalized financial data (e.g., financial data that has been reviewed, processed, and/or confirmed to be up-to-date). A server of the OBW server type receives updated financial data from an EPM platform as it is generated and/or updated. The updated financial data is then stored in a server of the OBW server type for a predetermined period of time. For example, the OBW server type may hold the updated financial data for up to six days (e.g., for a week). On the seventh day, the updated financial data is transmitted (e.g., transported, moved, or the like) from a server of the OBW server type to a server of the ABW server type. In this way, the server of the ABW server type is configured to distribute updated financial data to various financial reporting applications or other systems of the EPM platform. Furthermore, upon its transmittal from the server of the OBW server type to the server of the ABW type, the updated financial data becomes finalized, either by the system of the present invention, a third party data processing application, an EPM platform, or the like, to ensure that the updated financial data is accurate and consistently utilized across all financial reporting applications (or files, other systems, platforms, or the like).

For example, when raw financial data is generated, updated, and/or released by an EPM platform, it is stored in a server of the OBW server type for one week. After passing of one week, the raw financial data becomes finalized by the system of the present invention (e.g., deemed accurate and ready for distribution to all financial reporting applications), a third party application or EPM platform, or the like. Finalized financial data is then transported from the server of the OBW server type to a server of an ABW server type. From the server of the ABW server type, the updated financial data may then be consistently distributed amongst the EPM platform to be utilized by various financial reporting applications. Distribution is typically accomplished by updating one or more files of financial data that are read and/or accessed by various financial reporting applications with the updated financial data.

The user is next enabled by the system of the present invention to select a server 204. The user is enabled to select one server or multiple servers. Selected servers may be of one server type (e.g., OBW or ABW), or a combination of server types (e.g., OBW and ABW). The user may select one or more servers by a server name, a server location, an Internet Protocol (IP) address from a menu (e.g., a drop-down menu), or the server name and/or identification information of the server (e.g., an IP address) may be manually inputted by the user. The server selection 204 identifies the server on which one or more files to be updated with updated financial data are stored. Typically, the system of the present invention is configured to list all servers in an EPM platform, and from this list of servers the user makes a selection. After the user makes a server selection, the server selection is received by the system of the present invention.

The user is next enabled by the system of the present invention to select one or more workbook options 206. Workbook options 206 include one or more files or one or more folders containing one or more files that are stored in the selected server(s). The system of the present invention enables the user to select all current files (e.g., all files that are stored in a folder or in a selected server(s)). Alternatively, the system of the present invention enables the user to select one particular file at a time (or one folder that includes multiple files) from the server by selecting and/or specifying (e.g., inputting, browsing, or the like) a direct file path. For example, the user may be enabled by the system of the present invention to select a folder located on the user's desktop that holds multiple files. Additionally, the user may be enabled to select one or more SharePoint files shared between multiple users and/or financial reporting applications.

Based on the user's selection of workbook options 206, the system of the present invention may present to the user via interface 200 a list of refresh options 208. For example, after the user specifies a file path to a folder that includes a plurality of files that need to be updated with updated financial data, the system of the present invention is configured to present to the user each file of the plurality of files included for user selection of one or more files. The user is then enabled by the system of the present invention to select one or more of the listed files for updating. Typically, the refresh options 208 enable a user to toggle between lists of workbook files and/or worksheet files, but other file types may also be included in the file listing (and therefore may be selected by the user for updating). Upon the user's selection of one or more files to be updated with updated financial data, the system of the present invention receives the user's selection of files.

Once one or more files have been selected by the user for updating, the user is next enabled the system of the present invention to schedule a time 210 of updating for each selected file. In this way, the user can predetermine exactly when the system of the present invention is to update the each selected file. For example, the user may schedule the updating of each selected file immediately after submitting each selected file for updating. Alternatively, the user may schedule the updating of each selected file at a particular time of day and/or on a particular day. The user may also schedule the updating of each selected file to occur on a delay, on a timer, or at a predetermined of time after submitting each selected file for updating. The user may also schedule the updating of each selected file to occur daily, weekly, monthly, yearly, and/or the like (e.g., to recur). The system of the present invention is configured to receive the schedule time and date for the updating of each selected file.

Once a scheduled time and date for updating each file has been set by the user, the user may then select the "Load" button 212. This button loads (e.g., inputs, enters, or the like) each of the selected files into a queue 214 of files to be updated by the system of the present invention. The queue 214 provides a summary of each selected file that is to be updated and therefore enables the user to easily monitor and review an update status of selected files from each server that have been selected for updating. The summary in the queue 214 may include a server name and a listing of files selected for updating. A selection of the "Unload" button 216 removes a selected file from the queue 214.

Loading a selected file into the queue 214 may cause the system of the present invention to receive all inputs, namely a server type 202, a server selection 204, workbook options 206, and refresh options 208, provided by the user and corresponding to the loaded file. Alternatively, the system of the present invention may receive each input as it is inputted and/or selected by the user (e.g., substantially simultaneously to being inputted and/or selected by the user).

The user is next enabled by the system of the present invention to initiate updating of each selected file at the specified time by selecting the "OK" button 218. The selected files in the queue 214 are typically selected by the system of the present invention for updating and/or updated according to when they were loaded into the queue 214 and/or based on a predetermined, scheduled time for updating the selected file. The "Cancel" button 220 clears the interface 200 of any inputted information and/or selections and resets the interface 200 so that the user may reattempt to schedule an updating of a selected file.

The system of the present invention is configured to prompt the user for authentication credentials before initiating the updating of a selected file. Typically, the user inputs authentication credentials, which are then received and stored by the system of the present invention. The system of the present invention then, utilizing the stored authentication credentials, may attempt to validate the authentication credentials. Validating the authentication credentials of the user includes comparing the received authentication credentials of the user to one or more predetermined authentication credentials stored in a database. Validating the authentication credentials of the user further includes determining a match between the authentication credentials of the user and one of the one or more predetermined authentication credentials. Once the user's authentication credentials are validated successfully (e.g., a match is determined), the system of the present invention is granted both read and wrote accesses to each of the selected files that are to be updated.

In this way, the system of the present invention requires the user to input authentication credentials only one time per initiation of updating of each selected file, regardless of the number of selected files. Therefore, the system of the present invention is enabled to retrieve updated financial data from each workbook and/or database of the EPM and transmit the updated financial data to each respective storage location of each selected file that is to be updated with updated financial data. In some embodiments, the system of the present invention stores the retrieved updated financial data. This manner of authentication validation enables the system of the present invention to transition and/or switch between OBW server types and ABW server types without further authentication and drastically improves performance of the system of the present invention and any associated EPM platforms and/or financial reporting applications. Previous manners of updating files with updated financial information require the user to provide separate authentication credentials (which then have to be validated) for each file and/or server that is to be updated. Clearly, the system of the present invention drastically reduces the amount of time required for logging in to each file that is to be updated.

Updating a selected file typically includes refreshing the selected file with updated financial data. Essentially, the selected file, which typically contains financial data, is synced with a file or database of the EPM platform that contains updated financial data. In this way, the updated financial data is transmitted by the system of the present invention from the file or database of the EPM platform and imported into the file selected by the user that is to be updated with updated financial data. Therefore, the system of the present invention facilitates the updating of each selected file with updated financial data.

In some embodiments, updating each selected file may include replacing any existing financial data stored in the selected file with updated financial data. As such, the existing financial data stored in the selected file is deleted, and the system of the present invention writes the updated financial data into the selected file. In other embodiments, updating each selected file may include appending existing financial data stored in the selected file with updated financial data. As such, the existing financial data stored in the selected file remains unmodified, and the system of the present invention writes the updated financial data into the selected file.

The system of the present invention is configured to update one or more tabs in a workbook and/or spreadsheet. The system of the present invention is also configured to keep any processor and/or computing device from falling asleep during updating processes.

FIG. 3 is an exemplary user interface 300 for enabling a user to review a generated update report. The system of the present invention is configured to generate an updated report based on updating the selected files(s). The report displays a log of each server that has been updated with updated financial data and includes a server name, a file name, a file path, and a refresh time (e.g., the time at which each file was updated) of each selected file that was updated by the system of the present invention. The system of the present invention may also notify the user by generating and transmitting to the user a message, an email, a notification, an alert, and/or the like. In this way, the user is enabled by the system of the present invention to review a summary of each completed file update by viewing the generated update report.

The system of the present invention is further configured to transmit the generated report to a second apparatus for user review and/or generation of a financial report using the updated financial data in the one or more updated files. For example, the system of the present invention may transmit the report to the user's mobile device for remote viewing and monitoring of update statuses. In some embodiments, the report may include the selected file(s) holding updated financial data for quick insertion and/or importation into financial reporting applications. From the report, the user may be enabled to download and/or view any attached files.

All in all, the system of the present invention is configured to assist the user with updating multiple files of various file types and/or formats stored on multiple servers with updated financial data for generation of up-to-date financial reports.

FIG. 4 is an exemplary block diagram illustrating technical components of a system 400 for implementing the system of the present invention for researching and resolving an error case as described in process flow 100 of FIG. 1, as well as the exemplary interfaces 200 and 300 as illustrated in FIGS. 2 and 3. As illustrated, the system environment 400 includes a network 410, a system 420, and a user input system 430.

As shown in FIG. 4, the system 420, and the user input system 430 are each operatively and selectively connected to the network 410, which may include one or more separate networks. In addition, the network 410 may include a telecommunication network, local area network (LAN), a wide area network (WAN), and/or a global area network (GAN), such as the Internet. It will also be understood that the network 410 is secure and may also include wireless and/or wireline and/or optical interconnection technology.

FIG. 4 also illustrates a system 420, in accordance with an embodiment of the present invention. The system 420 may refer to the "system of the present invention" described herein. The system 420 may include any computerized apparatus that can be configured to perform any one or more of the functions of the system 420 described and/or contemplated herein. In accordance with some embodiments, for example, the system 420 may include a computer network, an engine, a platform, a server, a database system, a front end system, a back end system, a personal computer system, and/or the like. Therefore, the system 420 may be a server managed by the entity. The system 420 may be located at the facility associated with the entity or remotely from the facility associated with the entity. In some embodiments, such as the one illustrated in FIG. 4, the system 420 includes a communication interface 422, a processor 424, and a memory 426, which includes a system application 428 and a datastore 429 stored therein. As shown, the communication interface 422 is operatively and selectively connected to the processor 424, which is operatively and selectively connected to the memory 426.

It will be understood that the system application 428 may be configured to implement any one or more portions of the various user interfaces and/or process flow described herein. The system application 428 may interact with the user application 438. It will also be understood that, in some embodiments, the memory includes other applications. It will also be understood that, in some embodiments, the system application 428 is configured to communicate with the datastore 429, the user input system 430, or the like.

It will be further understood that, in some embodiments, the system application 428 includes computer-executable program code portions for instructing the processor 424 to perform any one or more of the functions of the system application 428 described and/or contemplated herein. In some embodiments, the system application 428 may include and/or use one or more network and/or system communication protocols.

In addition to the system application 428, the memory 426 also includes the datastore 429. As used herein, the datastore 429 may be one or more distinct and/or remote datastores. In some embodiments, the datastore 429 is not located within the system and is instead located remotely from the system. In some embodiments, the datastore 429 stores information or data described herein.

It will be understood that the datastore 429 may include any one or more storage devices, including, but not limited to, datastores, databases, and/or any of the other storage devices typically associated with a computer system. It will also be understood that the datastore 429 may store information in any known way, such as, for example, by using one or more computer codes and/or languages, alphanumeric character strings, data sets, figures, tables, charts, links, documents, and/or the like. Further, in some embodiments, the datastore 429 may include information associated with one or more applications, such as, for example, the system application 428. It will also be understood that, in some embodiments, the datastore 429 provides a substantially real-time representation of the information stored therein, so that, for example, when the processor 424 accesses the datastore 429, the information stored therein is current or substantially current.

It will be understood that the embodiment of the system environment illustrated in FIG. 4 is exemplary and that other embodiments may vary. As another example, in some embodiments, the system 420 includes more, less, or different components. As another example, in some embodiments, some or all of the portions of the system environment 400 may be combined into a single portion. Likewise, in some embodiments, some or all of the portions of the system 420 may be separated into two or more distinct portions.

In addition, the various portions of the system environment 400 may be maintained for and/or by the same or separate parties. It will also be understood that the system 420 may include and/or implement any embodiment of the present invention described and/or contemplated herein. For example, in some embodiments, the system 420 is configured to implement any one or more of the embodiments of the process flow 100 described and/or contemplated herein. Additionally, the system 420 or the user input system 430 is configured to initiate presentation of any of the user interfaces described herein.

The user input system 430 may include any computerized apparatus that can be configured to perform any one or more of the functions of the user input system 430 described and/or contemplated herein. For example, the user 435 may use the user input system 430 (e.g., a mobile device) to transmit and/or receive information or commands to and from the system 420. In some embodiments, for example, the user input system 430 may include a personal computer system (e.g. a non-mobile or non-portable computing system, or the like), a mobile computing device, a personal digital assistant, a mobile phone, a tablet computing device, a network device, a wearable computing device, a sensor, and/or the like. As illustrated in FIG. 4, in accordance with some embodiments of the present invention, the user input system 430 includes a communication interface 432, a processor 434, a memory 436 having a user application 438 stored therein, and a user interface 439. In such embodiments, the communication interface 432 is operatively and selectively connected to the processor 434, which is operatively and selectively connected to the user interface 439 and the memory 436. In some embodiments, the user 435 may use the user application 438 to execute processes described with respect to the process flow and interfaces described herein. Specifically, the user application 438 executes the process flow described in FIG. 1.

Each communication interface described herein, including the communication interface 432, generally includes hardware, and, in some instances, software, that enables the user input system 430, to transport, send, receive, and/or otherwise communicate information to and/or from the communication interface of one or more other systems on the network 410. For example, the communication interface 432 of the user input system 430 may include a wireless transceiver, modem, server, electrical connection, and/or other electronic device that operatively connects the user input system 430 to another system such as the system 420. The wireless transceiver may include a radio circuit to enable wireless transmission and reception of information. Each processor described herein, including the processor 434, generally includes circuitry for implementing the audio, visual, and/or logic functions of the user input system 430. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 438 of the memory 436 of the user input system 430.

Each memory device described herein, including the memory 436 for storing the user application 438 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 4, the memory 436 includes the user application 438. In some embodiments, the user application 438 includes an interface for communicating with, navigating, controlling, configuring, and/or using the user input system 430. In some embodiments, the user application 438 includes computer-executable program code portions for instructing the processor 434 to perform one or more of the functions of the user application 438 described and/or contemplated herein. In some embodiments, the user application 438 may include and/or use one or more network and/or system communication protocols.

Also shown in FIG. 4 is the user interface 439. In some embodiments, the user interface 439 includes one or more output devices, such as a display and/or speaker, for presenting information to the user 435. In some embodiments, the user interface 439 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user 435. In some embodiments, the user interface 439 includes the input and display devices of a mobile device, which are operable to receive and display information.

Also shown in FIG. 4 is a user 435 of the user input system 430. The user input system 430 may be any computing device. The user 435 may be a person who uses the user input system 430 to execute a user application 438. The user application 438 may be an application to communicate with the system 420, perform a transaction, input information onto a user interface presented on the user input system 430, receive and/or transmit information, the like. The user application 438 and/or the system application 428 may incorporate one or more parts of any process flow described herein.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for electronically retrieving updated financial data stored on an electronic performance management (EPM) platform and updating electronic files, the system comprising:

at least one non-transitory electronic storage device;

at least one processor; and at least one module stored in said storage device and comprising instruction code that is executable by the at least one processor and configured to cause said at least one processor to:

establish a communication link with a user device, wherein establishing further comprises generating a data channel with the user device;

initiate, via the established communication link, a presentation of a first user interface for display on the user interface, wherein the first user interface comprises one or more server types associated with the EPM platform, wherein the one or more server types comprises an outsider business warehouse (OBW) server type and an analytical business warehouse (ABW) server type, wherein the OBW server type comprises a local server native to the EPM platform that generates, reports, and/or updates financial data, wherein the local server holds raw financial data, wherein the ABW server type comprises a proxy server that serves as an intermediary storage platform between a server of the at least one server type and one or more outside applications that require access to updated financial data, wherein the proxy server holds finalized financial data;

electronically receive, via the established communication link, a user selection of at least one server type and one or more servers associated with the at least one server type, wherein the one or more servers selected by the user comprises one or more files that require updating with financial data;

initiate a link with the at least one server type and the one or more servers associated with the at least one server type based on at least the user selection, wherein initiating further comprises:

receiving one or more authentication credentials from the user;

validating the one or more credentials received from the user;

determining a match between the authentication credentials of the user and one or more predetermined authentication credentials; and granting at least read and write access to the one or more servers associated with the at least one server type selected by the user, and the one or more files associated with the one or more servers associated with the at least one server type, wherein granting further comprises enabling the user to transition between the one or more server types without further authentication;

initiate on the first user interface, one or more files associated with the one or more servers associated with the at least one server type, wherein the one or more files are granted with read and write access;

electronically receive, via the established communication link, a user selection of at least one file from the one or more files to be updated with updated financial data;

electronically receive scheduling information to update the at least one file with the updated financial data at a predetermined time, wherein scheduling further comprises placing the at least one file to be updated in a queue;

electronically retrieve updated financial data from at least one storage location associated with the one or more servers selected by the user based on at least the received scheduling information; and automatically update the at least one file with the updated financial data based on at least the scheduling information, wherein updating further comprises appending information that exists in the at least one file with the updated financial data.

2. The system of claim 1, wherein the instruction code of said module for causing the at least one processor to update the one or more files comprises instruction code for causing the at least one processor to update the one or more files at a predetermined time.

3. The system of claim 1, wherein the instruction code of said module for causing the at least one processor to update the one or more files comprises instruction code for causing the at least one processor to update the one or more files at a predetermined time and on a recurring basis.

4. The system of claim 1, wherein the instruction code of said module for causing the at least one processor to update the one or more files comprises instruction code for causing the at least one processor to write the updated financial data into the file, thereby replacing any existing data in the file with the updated financial data.

5. The system of claim 1, wherein the module further comprises instruction code configured to cause said processor to generate a report based on updating the one or more files, the report comprising a server name, a file name, a file path, and a refresh time of each of the one or more updated files.

6. The system of claim 5, wherein the module further comprises instruction code configured to cause said processor to transmit the report to a mobile device of the user.

7. The system of claim 1, wherein the instruction code of said module for causing the at least one processor to determine one or more files to be updated comprises instruction code for causing the at least one processor to generate an update queue and add each of the one or more files to be updated to the update queue.

8. The system of claim 1, wherein the instruction code of said module for causing the at least one processor to receive an input comprises instruction code to receive an input that comprises information identifying at least one file, where the information comprises at least one of a server type, a server name, a server location, a server selection, a file path, a workbook name, a worksheet name, a file name, an Internet Protocol (IP) address, and a file selection.

9. The system of claim 1, wherein the module further comprises instruction code configured to cause said processor to transmit the one or more updated files to an apparatus for generation of a financial report comprising the updated financial data of the one or more updated files.

10. A computer implemented method for updating files with updated financial data, the method comprising:

establishing a communication link with a user device, wherein establishing further comprises generating a data channel with the user device;

initiating, via the established communication link, a presentation of a first user interface for display on the user interface, wherein the first user interface comprises one or more server types associated with the EPM platform, wherein the one or more server types comprises an outsider business warehouse (OBW) server type and an analytical business warehouse (ABW) server type, wherein the OBW server type comprises a local server native to the EPM platform that generates, reports, and/or updates financial data, wherein the local server holds raw financial data, wherein the ABW server type comprises a proxy server that serves as an intermediary storage platform between a server of the at least one server type and one or more outside applications that require access to updated financial data, wherein the proxy server holds finalized financial data;

electronically receiving, via the established communication link, a user selection of at least one server type and one or more servers associated with the at least one server type, wherein the one or more servers selected by the user comprises one or more files that require updating with financial data;

initiating, using a computing device processor, a link with the at least one server type and the one or more servers associated with the at least one server type based on at least the user selection, wherein initiating further comprises:

receiving one or more authentication credentials from the user;

validating the one or more credentials received from the user;

determining a match between the authentication credentials of the user and one or more predetermined authentication credentials; and granting at least read and write access to the one or more servers associated with the at least one server type selected by the user, and the one or more files associated with the one or more servers associated with the at least one server type, wherein granting further comprises enabling the user to transition between the one or more server types without further authentication;

initiating, via the established communication link, one or more files associated with the one or more servers associated with the at least one server type, wherein the one or more files are granted with read and write access;

electronically receiving, via the established communication link, a user selection of at least one file from the one or more files to be updated with updated financial data;

electronically receiving, using a computing device processor, scheduling information to update the at least one file with the updated financial data at a predetermined time, wherein scheduling further comprises placing the at least one file to be updated in a queue;

electronically retrieving, using a computing device processor, updated financial data from at least one storage location associated with the one or more servers selected by the user based on at least the received scheduling information; and automatically updating, using a computing device processor, the at least one file with the updated financial data based on at least the scheduling information, wherein updating further comprises appending information that exists in the at least one file with the updated financial data.

11. The method of claim 10, wherein updating the one or more files comprises updating the one or more files at a predetermined time and on a recurring basis.

12. The method of claim 10, wherein updating the one or more files comprises writing the updated financial data into the file, thereby replacing any existing data in the file with the updated financial data.

13. The method of claim 10 further comprising generating a report based on updating the one or more files, the report comprising a server name, a file name, a file path, and a refresh time of each of the one or more updated files.

14. A computer program product for updating files with updated financial data, the computer program product comprising a non-transitory computer-readable medium comprising instruction code configured to cause an apparatus to:
    establish a communication link with a user device, wherein establishing further comprises generating a data channel with the user device;
    initiate, via the established communication link, a presentation of a first user interface for display on the user interface, wherein the first user interface comprises one or more server types associated with the EPM platform, wherein the one or more server types comprises an outsider business warehouse (OBW) server type and an analytical business warehouse (ABW) server type, wherein the OBW server type comprises a local server native to the EPM platform that generates, reports, and/or updates financial data, wherein the local server holds raw financial data, wherein the ABW server type comprises a proxy server that serves as an intermediary storage platform between a server of the at least one server type and one or more outside applications that require access to updated financial data, wherein the proxy server holds finalized financial data;
    electronically receive, via the established communication link, a user selection of at least one server type and one or more servers associated with the at least one server type, wherein the one or more servers selected by the user comprises one or more files that require updating with financial data;
    initiate a link with the at least one server type and the one or more servers associated with the at least one server type based on at least the user selection, wherein initiating further comprises:
        receiving one or more authentication credentials from the user;
        validating the one or more credentials received from the user;
        determining a match between the authentication credentials of the user and one or more predetermined authentication credentials; and
        granting at least read and write access to the one or more servers associated with the at least one server type selected by the user, and the one or more files associated with the one or more servers associated with the at least one server type, wherein granting further comprises enabling the user to transition between the one or more server types without further authentication;
    initiate, via the established communication link, one or more files associated with the one or more servers associated with the at least one server type, wherein the one or more files are granted with read and write access;
    electronically receive, via the established communication link, a user selection of at least one file from the one or more files to be updated with updated financial data;
    electronically receive scheduling information to update the at least one file with the updated financial data at a predetermined time, wherein scheduling further comprises placing the at least one file to be updated in a queue;
    electronically retrieve updated financial data from at least one storage location associated with the one or more servers selected by the user based on at least the received scheduling information; and
    automatically update the at least one file with the updated financial data based on at least the scheduling information, wherein updating further comprises appending information that exists in the at least one file with the updated financial data.

15. The computer program product of claim 14, wherein the non-transitory computer-readable medium comprising instruction code causing an apparatus to update the one or more files comprises non-transitory computer-readable medium comprising instruction code causing an apparatus to update the one or more files at a predetermined time and on a recurring basis.

16. The computer program product of claim 14, wherein the non-transitory computer-readable medium comprising instruction code causing an apparatus to update the one or more files comprises non-transitory computer-readable medium comprising instruction code causing an apparatus to write the updated financial data into the file, thereby replacing any existing data in the file with the updated financial data.

17. The computer program product of claim 14, wherein the non-transitory computer-readable medium comprises instruction code further causing an apparatus to generate a report based on updating the one or more files, the report comprising a server name, a file name, a file path, and a refresh time of each of the one or more updated files.

* * * * *